US008240924B2

United States Patent
Wu

(10) Patent No.: US 8,240,924 B2
(45) Date of Patent: Aug. 14, 2012

(54) OPTICAL FIBER CONNECTOR

(75) Inventor: Kun-Chan Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 266 days.

(21) Appl. No.: 12/766,835

(22) Filed: Apr. 23, 2010

(65) Prior Publication Data

US 2011/0150396 A1  Jun. 23, 2011

(30) Foreign Application Priority Data

Dec. 21, 2009  (TW) ................................ 98143829 A

(51) Int. Cl.
*G02B 6/36* (2006.01)
(52) U.S. Cl. ........................................................ 385/53
(58) Field of Classification Search .................. None
See application file for complete search history.

(56) References Cited

U.S. PATENT DOCUMENTS

| 7,448,810 | B2 * | 11/2008 | Ko .................................. 385/92 |
| 2004/0062486 | A1 * | 4/2004 | Tanaka et al. ................... 385/55 |
| 2011/0150396 | A1 * | 6/2011 | Wu ................................. 385/70 |

FOREIGN PATENT DOCUMENTS

EP    570652 A2 *  11/1993

* cited by examiner

*Primary Examiner* — Sung Pak
(74) *Attorney, Agent, or Firm* — Altis Law Group, Inc.

(57) ABSTRACT

A socket and a plug are provided. Both the socket and the plug include a body, a blocking sheet, and an elastic member. Both the bodies define a coupling portion. The blocking sheet is disposed on the corresponding body and covers the corresponding coupling portion to protect the coupling portions from being contaminated when not used. The elastic member connects the corresponding body and the blocking sheet. When the plug is plugged into the socket, the blocking sheets, against an elastic force of the elastic member, pushes each other to expose the coupling portions until the coupling portions are coupled.

6 Claims, 6 Drawing Sheets

OPTICAL FIBER CONNECTOR

BACKGROUND

1. Technical Field

The present disclosure relates to an optical fiber connector.

2. Description of Related Art

Optical fiber connectors generally include a socket and a plug. In use, the socket and the plug terminate ends of two optical fibers, respectively, and the plug is plugged into the socket to provide quick connection between the two optical fibers. Generally, both the socket and the plug include an optical coupling surface for optically coupling the socket and the plug. When the two optical fibers are disconnected, the plug is unplugged from the socket. The optical coupling surfaces are exposed and easily contaminated, reducing connection quality of the optical fiber connector.

Therefore, it is desirable to provide an optical fiber connector, which can overcome the abovementioned shortcomings.

BRIEF DESCRIPTION OF THE DRAWINGS

Many aspects of the present optical fiber connector should be better understood with reference to the following drawings. The components in the drawings are not necessarily drawn to scale, the emphasis instead being placed upon clearly illustrating the principles of the present optical fiber connector. Moreover, in the drawings, like reference numerals designate corresponding parts throughout the several views.

DETAILED DESCRIPTION

Embodiments of the present optical fiber connector will now be described in detail with reference to the drawings.

Figure 1:
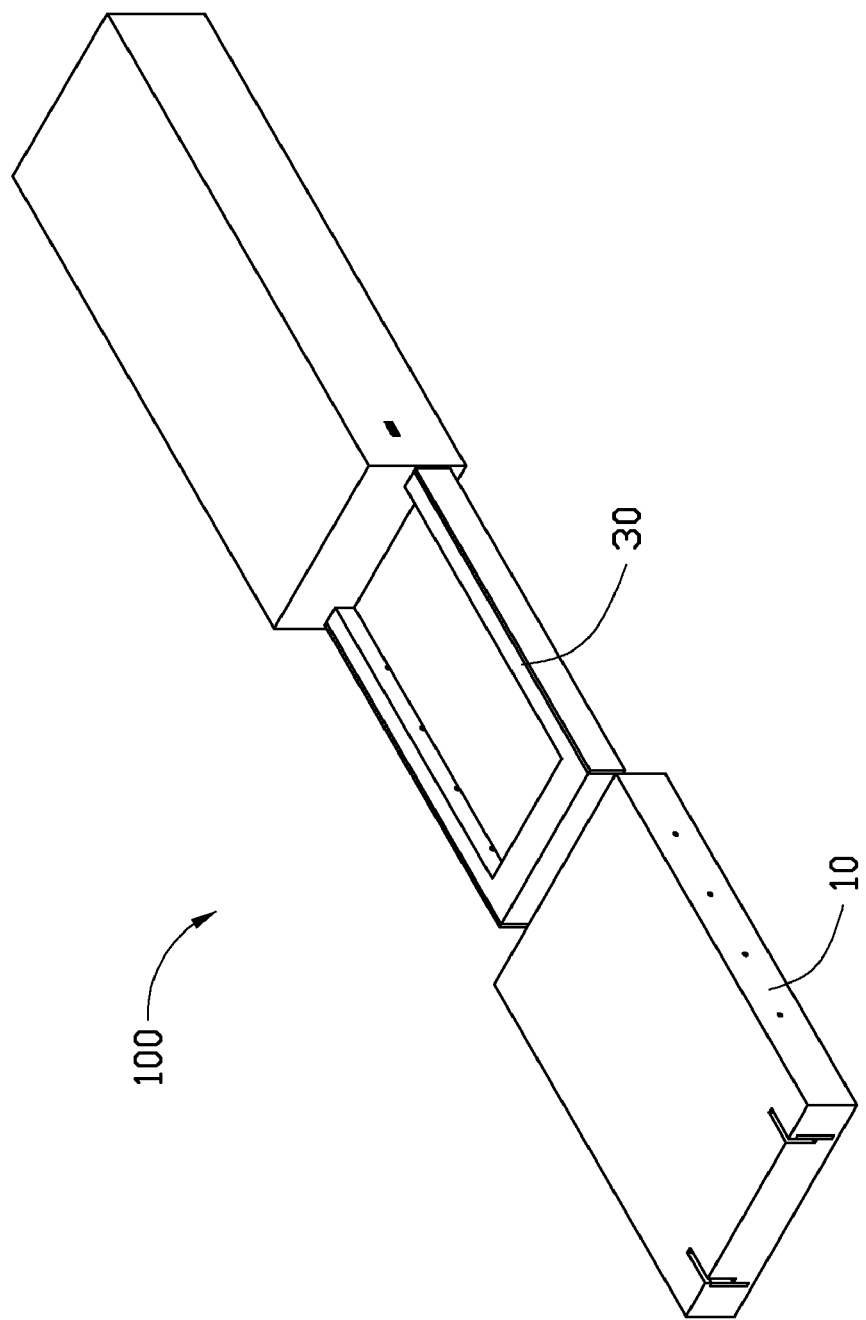
FIG. 1 is an isometric, assembled, schematic view of an optical fiber connector, according to an exemplary embodiment.

Referring to FIG. 1, an optical fiber connector 100, according to an exemplary embodiment, includes a socket 10 and a plug 30.

Figure 2:
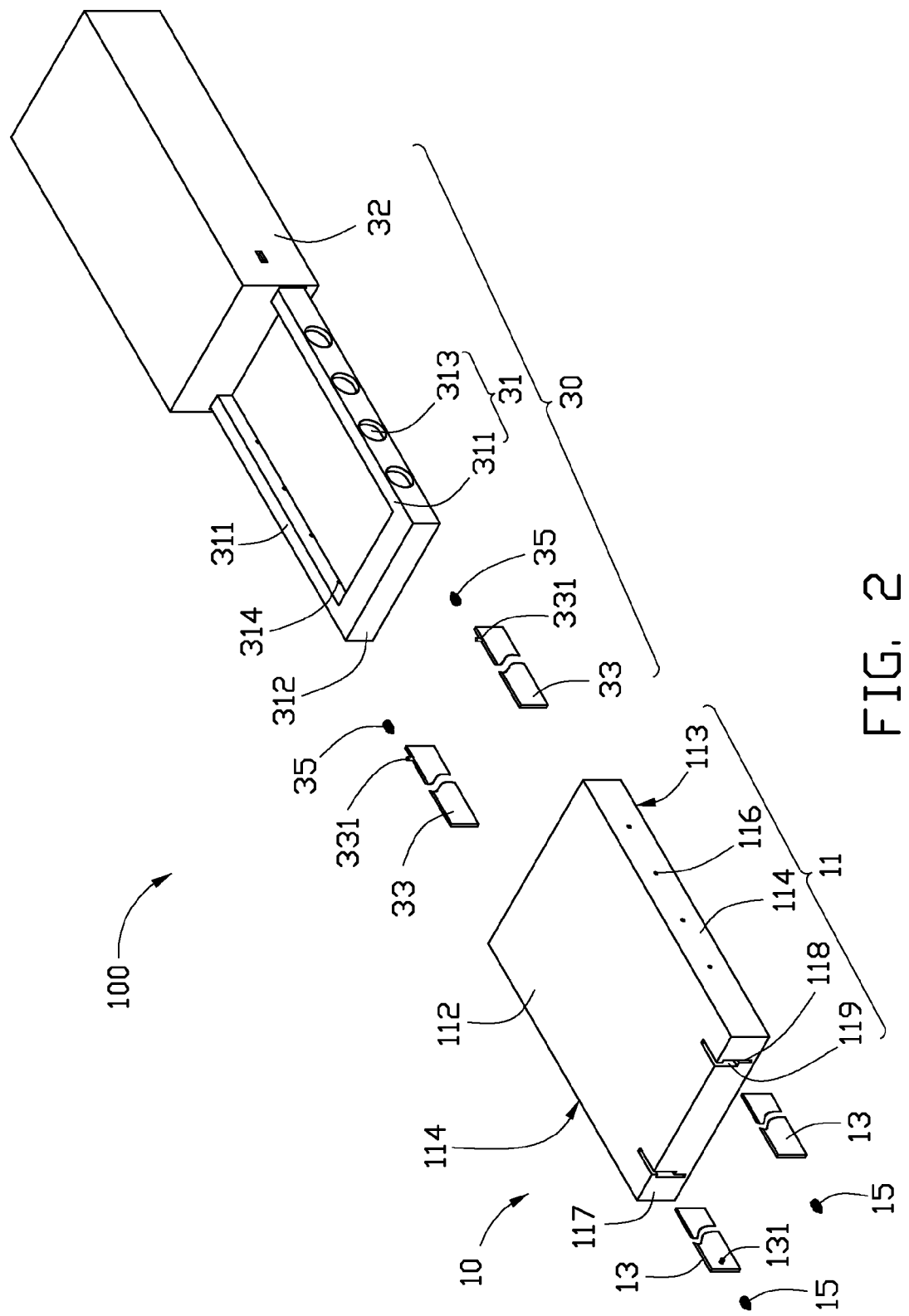
FIG. 2 is an isometric, exploded, schematic view of the optical fiber connector of FIG. 1.
Figure 3:
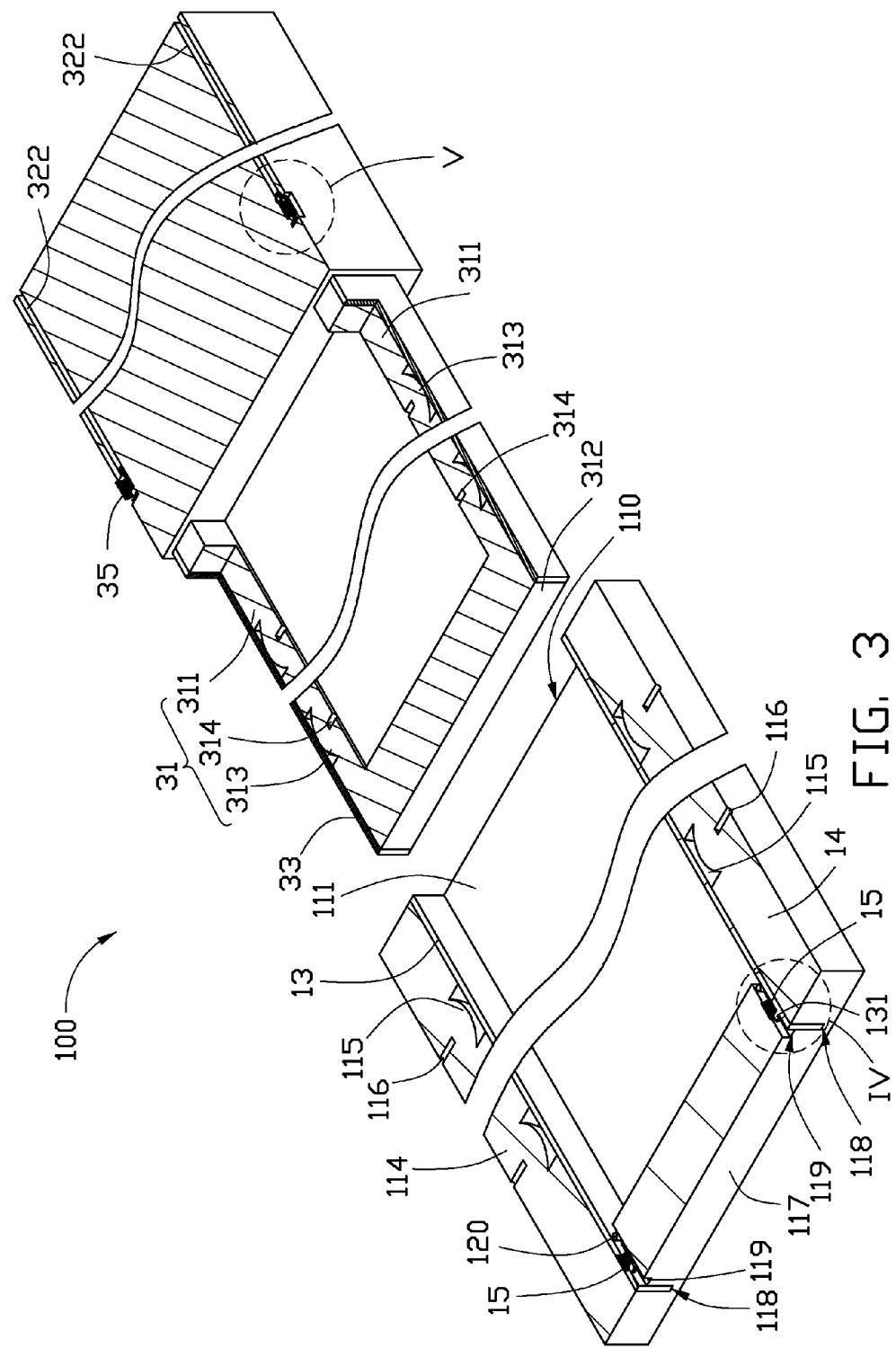
FIG. 3 is an isometric, cutaway, schematic view of the optical fiber connector of FIG. 1.

Referring to FIGS. 1-2, the socket 10 is made of transparent material, such as transparent plastic or glass. The socket 10 includes a substantially cubic socket body 11, two strip-shaped first blocking sheets 13, and two first elastic members 15.

The socket body 11 defines a cubic insertion groove 111 in one end surface (not labeled, e.g., a front surface) thereof and correspondingly forms a top board 112, a bottom board 113, two side boards 114, and a rear board 117. The insertion groove 111 is bounded by the boards 112, 113, 114, 117, and extends out of the socket body 11 via a rectangular opening 110.

Each side board 114 defines two linearly arranged first fiber-receiving portions 116 in the outer surface thereof and two linearly arranged first coupling portions 115 in the inner surface thereof. Each first coupling portion 115 is aligned with a corresponding first fiber-receiving portion 115 and configured for converting divergent light rays from an optical fiber (not shown) received in the corresponding first fiber-receiving portion 115 into parallel light rays and converging parallel light rays transmitting therethrough into the optical fiber.

In this embodiment, the first fiber-receiving portion 116 is a blind hole for fittingly and firmly receiving the optical fiber. The first coupling portion 115 is a recess having a spherical or aspherical bottom surface convex towards the insertion groove 111. The focal point of the first coupling portion 115 (i.e., the spherical or aspherical bottom surface) is at the end of the first fiber-receiving portion 116 (i.e., the blind hole). As such, the first coupling portion 115 can efficiently convert divergent light rays from the optical fiber into parallel light rays and converge parallel light rays transmitting therethrough into the optical fiber.

The rear board 117 defines two first sliding slots 118 therethrough. The first sliding slots 118 extend through the rear board 117 along the extending directions of the inner surfaces of the side boards 114, respectively. The first sliding slots 118 are positioned inside above the inner surface of the corresponding side board 114 and communicate with the insertion groove 111. The width of the first sliding slots 118 is slightly larger than that of the first blocking sheets 13.

Figure 4:
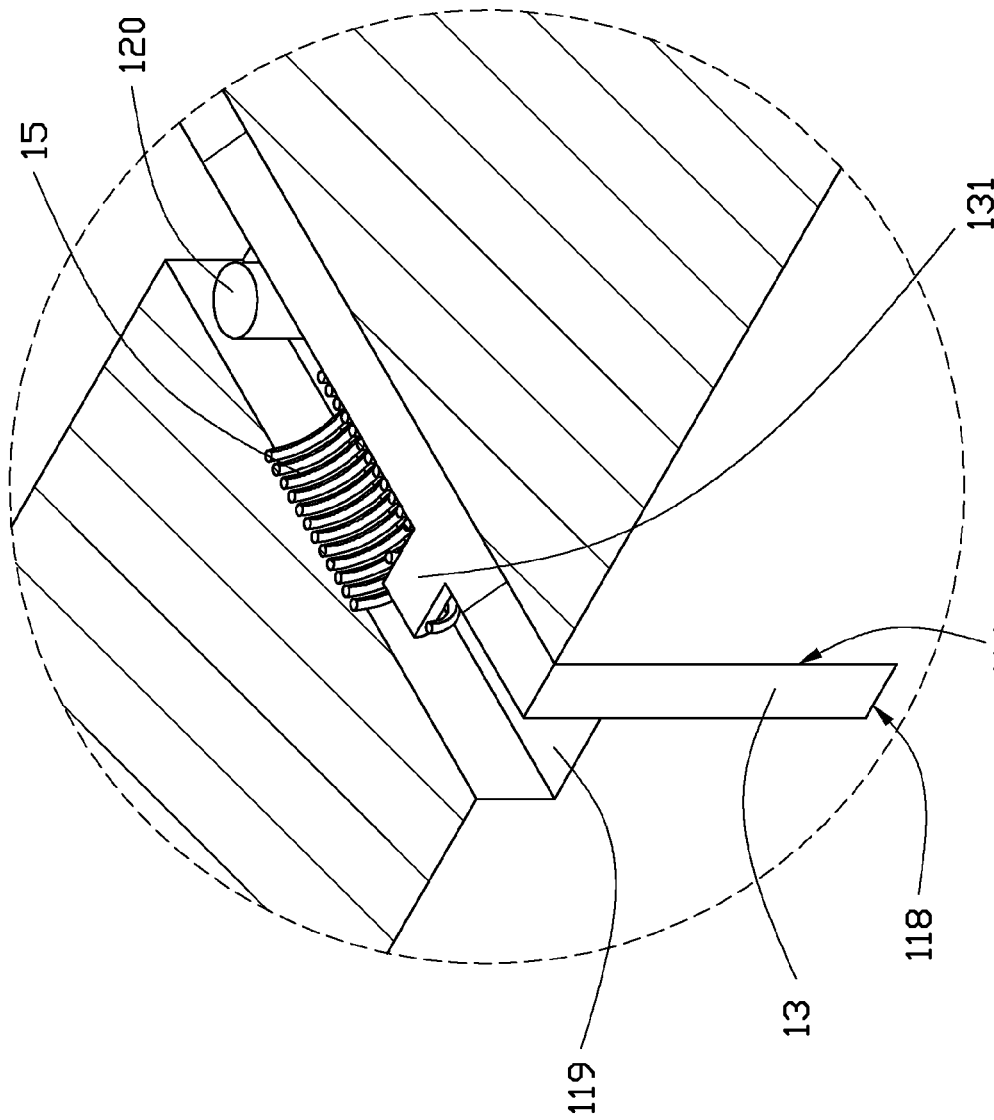
FIG. 4 is an enlarged view of a portion IV of FIG. 3.

Also referring to FIG. 4, the rear board 117 also defines two first fixing slots 119 therethrough. The first fixing slots 119 are positioned at intersections of the rear board 117, the top board 112, and the two side boards 114, respectively, and outside beneath the inner surface of the corresponding side board 114 and communicate with the insertion groove 111 and the corresponding first sliding slot 118. The height of the first fixing slots 119 is much smaller than that of the first sliding slots 118, thereby forming a stepped surface (not labeled) between the first sliding slot 118 and the corresponding first fixing slot 119. The socket body 11 further includes a fixing bolt 120 extending up from the step surface, adjacent to the insertion groove 111.

The first blocking sheets 13 are shaped corresponding to the inner surfaces of the side boards 14, respectively. The length of the first blocking sheet 13 is substantially equal to the total length of the insertion groove 111 and the first sliding slot 118. Each of the first blocking sheets 13 extends a first protrusion 131 from one side surface (not labeled), adjacent to one distal end thereof.

The first elastic members 15 are coil springs.

In assembly of the socket 10, the first blocking sheets 13 are disposed on and cover the inner surfaces of the side boards 14 and are slidably inserted into the first sliding slots 118, respectively. The first protrusions 131 are received in the first fixing slots 119 respectively. The first elastic members 15 are received in the corresponding first fixing slot 119 and connect the corresponding first fixing bolt 120 to the corresponding first protrusion 131. When the first elastic members 15 are in a natural state (i.e., without being compressed or stretched), the first blocking sheets 13 fittingly cover the inner surfaces of the side boards 14 to shield the first coupling portions 115 from being contaminated.

The plug 30 is also made of transparent material and complementary to the socket 10 in shape and includes counterparts of the socket 10. In particular, the plug 30 includes a plug body 31, a cubic connecting block 32, two second blocking sheets 33, and two second elastic members 35.

The plug body 31 is a rectangular frame that can be fittingly inserted into the insertion groove 111. In detail, the plug body 31 includes two parallel sliding boards 311 extending outward from the connecting block 32 and a head board 312 perpendicularly connecting the two sliding boards 311.

Figure 6:
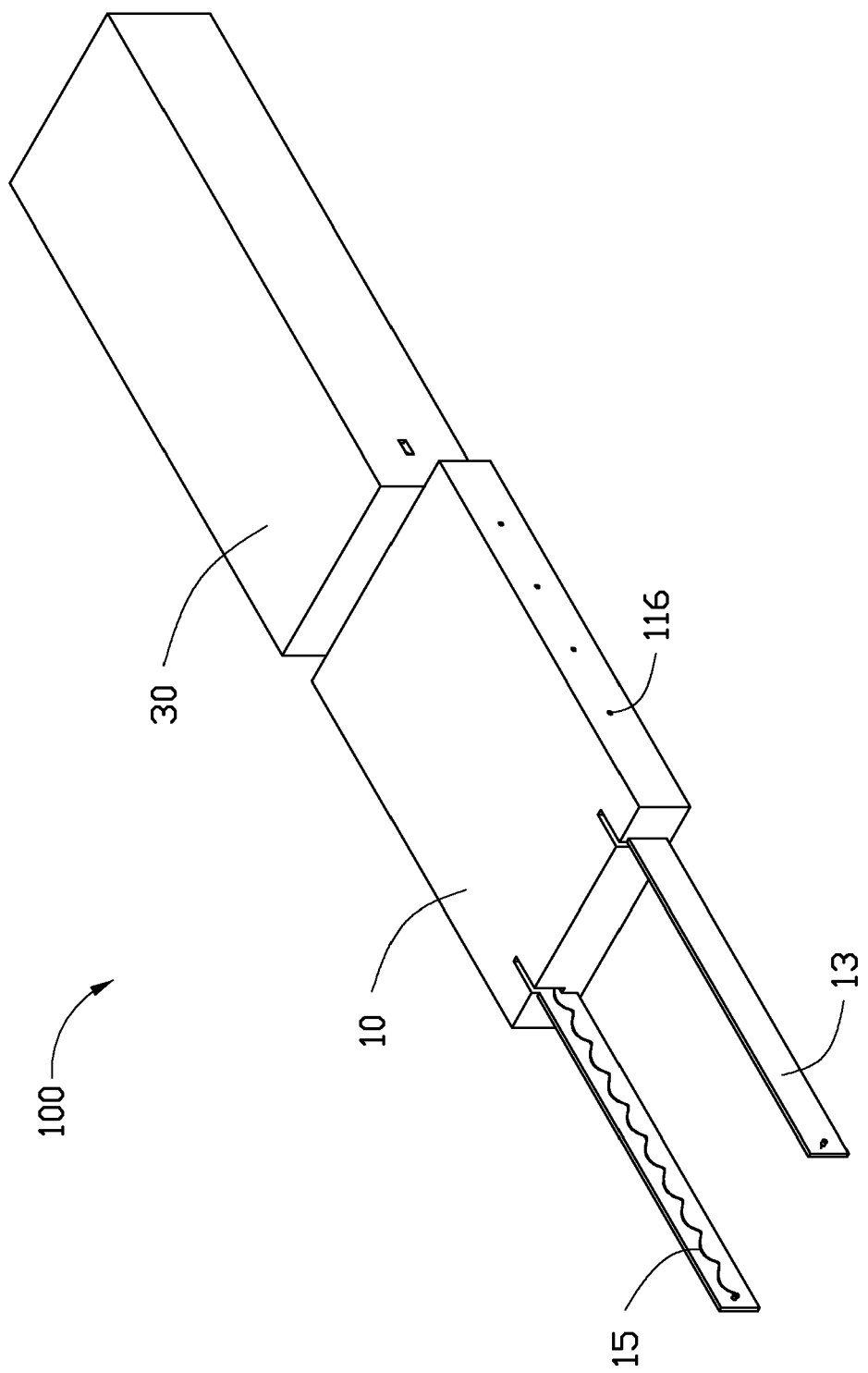
FIG. 6 is an isometric, assembled, schematic view of the optical fiber connector of FIG. 1 in another state.

Each sliding board 311 defines two linearly arranged second fiber-receiving portions 314 in the outer surface thereof and two linearly arranged second coupling portions 313 in the inner surface thereof. The second fiber-receiving portions 314 and the second coupling portions 313 are counterparts of the first fiber receiving portions 116 and the first coupling portions 115, respectively, and have substantially similar or complementary structures and functions. The first and second coupling portions 115 and 313 are designed to match each other so that when the plug 30 is plugged into the socket 10, the first and second coupling portions 115 and 313 are coupled with each other (see FIG. 6), that is, the first and second coupling portions 115 and 313 can transmit parallel light rays therebetween.

The connecting block 32 defines two second sliding slots 322 therethrough in an end surface from which the sliding board 311 extends. The second sliding slots 322 extend along the extending directions of the outer surface of the sliding boards 311, respectively. The second slots 322 are positioned outside above the outer surface of the sliding boards 311. The widths of the second sliding slots 322 are substantially equal to or slightly larger than widths of the second blocking sheets 35.

Figure 5:
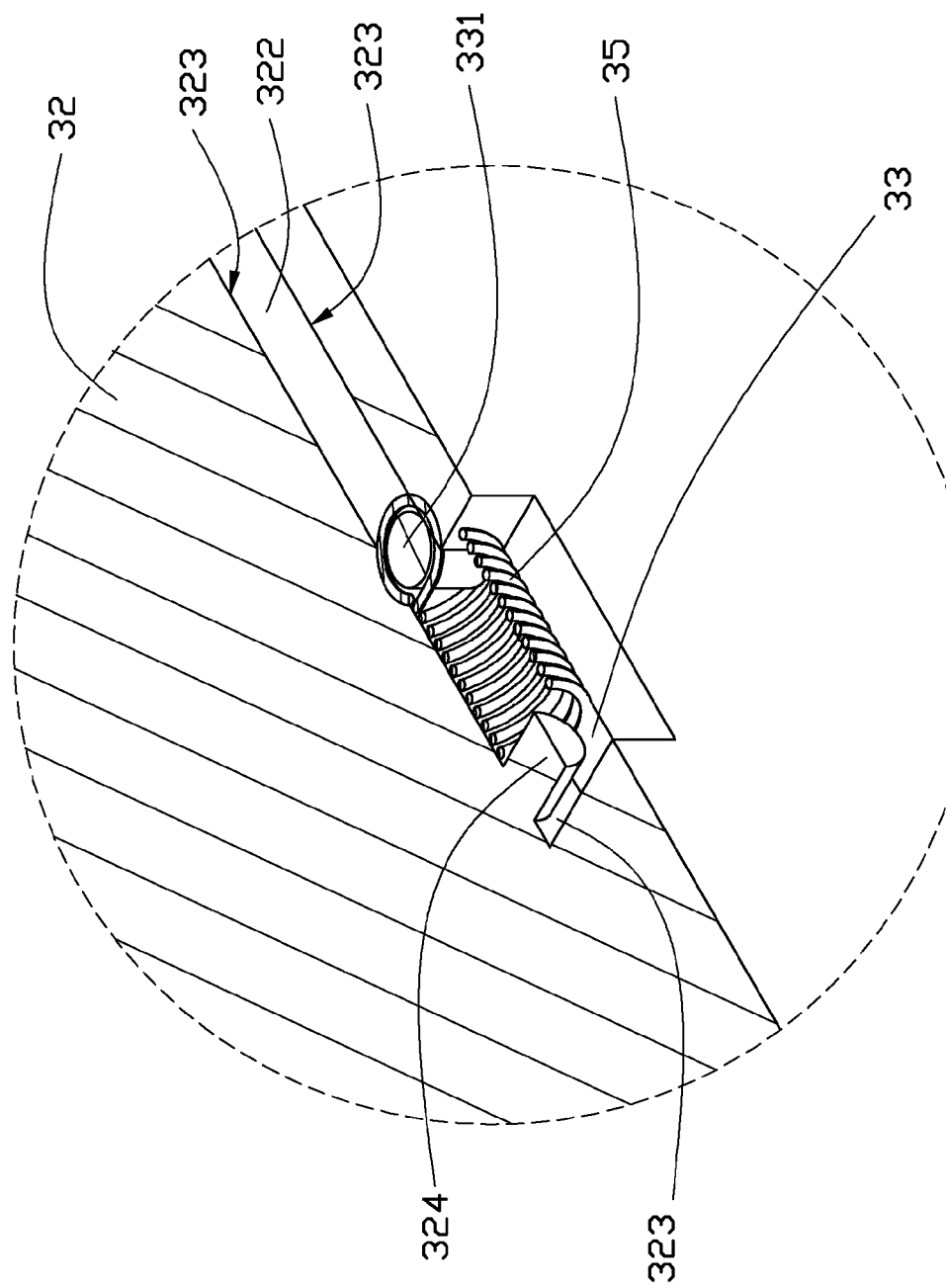
FIG. 5 is an enlarged view of a portion V of FIG. 3.

Also referring to FIG. 5, each second sliding slot 322 is bounded by two opposite side inner surfaces 323. The connecting block 32 includes two second fixing bolts 324. Each second fixing bolt 324 uprightly extends outward from one of the side inner side surfaces 323 of the corresponding second sliding slot 322 at an appropriate position.

The second blocking sheets 33 are shaped corresponding to the outer surfaces of the sliding boards 311, respectively. The length of the second blocking sheet 33 is longer than the distance between the head board 312 and the fixing bolt 324. A second protrusion 331 extends from a top surface (not labeled) of each of the second blocking sheets 33, adjacent to one distal end thereof.

The second elastic members 35 are also coil springs.

In assembly of the plug 30, the second blocking sheets 33 are disposed on and cover the outer surfaces of the sliding boards 311 and are slidably inserted into the second sliding slots 322, respectively. The second protrusions 331 are received in the second sliding slots 322, respectively. The second elastic members 35 are each received in the corresponding second sliding slots 322 and connect to the corresponding second fixing bolt 324 and the corresponding second protrusion 331. When the second elastic members 35 are in a natural state (i.e., without being compressed or stretched), the second blocking sheets 33 fittingly cover the outer surfaces of the sliding boards 311 to shield the second coupling portions 313 from being contaminated.

In alternative embodiments, the number of the fiber-receiving portions 116, 314, and the coupling portions 11 in one side board 114 and sliding board 311 need not be limited to two, but can be one or more than two. When more than two fiber-receiving portions 116, 314 and coupling portions 115, 313 are employed, the fiber-receiving portions 116, 314 and the coupling portions 115, 313 can be equidistantly arranged. The fiber-receiving portions 116, 314 and the coupling portions 115, 313 can also be randomly, instead of linearly and equidistantly, arranged. In another embodiment, only one fiber-receiving portion 116, 314, and coupling portion 115, 313 are employed and defined in one of the side boards 114 and sliding boards 311. In such embodiment, only one blocking sheet 13 and 33 is enough to cover the coupling portion 115 and 313, the other one can be omitted. Furthermore, the coupling portions 115 can be positioned in other inner surface, for example, the inner surface of the top board 112 or 113.

The configuration of the socket body 11 and the connecting block 32 are not limited to this embodiment too. Any configuration that: (1) allows the socket elastic members 15 to connect the socket body 11 and the socket blocking sheets 13 and allows the plug elastic members 35 to connect the connecting block 32 to the plug blocking sheets 33; and (2) can limit the blocking sheets 13 and 33 to slide on the inner surface when pushed against each other, can be used instead.

The blocking sheets 13 and 33 are also not limited to this embodiment too. If other ways to connect the elastic members 15 and 35 are provided, the protrusions 131 and 331 can be replaced with other required configurations. The lengths of the blocking sheets 13 and 33 are also not limited to this embodiment. Actually, any length of the blocking sheets 13 and 33 that satisfies: (1) when the elastic members 15 and 35 are in the natural state, the coupling portions 115 and 314 are covered thereby; and (2) when the elastic members 15 and 35 are compressed or extended, the coupling portions 115 and 314 are exposed thereby, can be employed.

In other embodiments the elastic members 15 and 35 can be rubber bands or other elastic members.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An optical fiber connector comprising:
    a transparent socket comprising:
        a socket body defines an insertion groove, a socket coupling portion in an inner surface of the insertion groove, and a socket sliding slot extending through the socket body along an extending direction of the inner surface;
        a socket blocking sheet disposed on the inner surface and slidably fitting into the socket sliding slot; and
        a socket elastic member connecting the socket body to the socket blocking sheet; and
    a transparent plug comprising;
        a connecting block;
        a plug body extending outward from the connecting block and comprising an outer surface corresponding to the inner surface; the plug body defining a plug coupling portion in the outer surface corresponding to the socket coupling portion; the connecting block defining a plug sliding slot therethrough along an extending direction of the outer surface;
        a plug blocking sheet disposed on the outer surface and slidably fitting into the plug sliding slot; and
        a plug elastic member connecting the connecting block and the plug blocking sheet;
    wherein when the plug body is fittingly plugged into the insertion groove, the socket and plug block sheets, against elastic forces of the socket and plug elastic members, push each other to slide away from each other along the socket and plug sliding slot to expose the socket and plug coupling portions until the socket and plug coupling portions are coupled; when the plug body is unplugged from the insertion groove, the socket and plug elastic members restore to a natural state and bring the socket and plug blocking sheet to slide back to a original position to cover the socket and plug coupling portions.

2. The optical fiber connector of claim 1, wherein the socket and plug coupling portion are recesses, the bottom surface of the recess being selected from the group consisting of a spherical surface and an aspherical surface.

3. The optical fiber connector of claim 1, wherein the socket body further defines a socket fiber-receiving portion in a surface thereof opposite to the inner surface and the socket fiber receiving portion is aligned with the socket coupling portion; wherein the plug body also defines a plug fiber-receiving portion in an surface thereof opposite to the inner surface and the plug fiber receiving portion is aligned with the plug coupling portion.

4. The optical fiber connector of claim 1, wherein the socket and plug coupling portion are recesses, the bottom surface of the recess being selected from the group consisting of a spherical surface and an aspherical surface; wherein the socket body also defines a socket fiber-receiving portion in an surface thereof opposite to the inner surface and the socket fiber receiving portion is aligned with the socket coupling portion; wherein the plug body also defines a plug fiber-receiving portion in an surface thereof opposite to the inner surface and the plug fiber receiving portion is aligned with the plug coupling portion; wherein the socket and plug fiber-receiving portions are blind holes each having a blinded end, the focal point of the socket coupling portion is at the blinded end of the socket fiber-receiving portion, and the focal point of the plug coupling portion is the blinded end of the plug fiber-receiving portion.

5. The optical fiber connector of claim 1, wherein the socket blocking sheet is shaped so as to fittingly cover the inner surface, and the plug blocking sheet is shaped so as to fittingly cover the outer surface.

6. The optical fiber connector of claim 1, wherein the socket and plug elastic members are coil springs.

* * * * *